United States Patent [19]

Adler et al.

[11] 3,714,594

[45] Jan. 30, 1973

[54] DEMODULATOR ACOUSTIC SURFACE WAVE DEVICE

[76] Inventors: Robert Adler, 327 Latrobe Avenue, Northfield; Adrian J. De Vries, OS-628 Kird Avenue, Elmhurst, both of Ill.; Fleming Dias, 285 College Avenue, Palo Alto, Calif.

[22] Filed: May 10, 1971

[21] Appl. No.: 141,912

Related U.S. Application Data

[62] Division of Ser. No. 817,093, April 17, 1969.

[52] U.S. Cl............329/117, 178/5.4 SD, 178/5.8 R, 307/233, 329/193, 329/198, 333/30 R, 333/72 R

[51] Int. Cl................................................H03d 3/16

[58] Field of Search......329/117, 119, 129, 130, 137, 329/138, 193, 198; 333/30, 72; 307/233

[56] References Cited

UNITED STATES PATENTS

| | | | |
|---|---|---|---|
| 3,487,318 | 12/1969 | Herman | 329/117 |
| 2,233,199 | 2/1941 | Donley | 329/117 |
| 3,596,211 | 7/1971 | Dias | 333/72 |
| 3,582,837 | 6/1971 | De Vries | 333/72 |
| 3,391,345 | 7/1968 | Burgert | 329/138 |

*Primary Examiner*—Alfred L. Brody
*Attorney*—Francis W. Crotty and Cornelius J. O'Connor

[57] ABSTRACT

A demodulator for use in a wave signal receiver that utilizes a program signal frequency modulated upon a predetermined carrier comprises an acoustic-surface-wave propagating medium. The program signal is applied directly across a transducer which is coupled to the medium and which, in response to the program signal, interacts with the acoustic-surface-waves on the medium. A unidirectional conductive device and a load are coupled in series across the transducer.

4 Claims, 8 Drawing Figures

Inventors
Robert Adler
Adrian J. DeVries
Fleming Dias
By Cornelius J. O'Connor
Attorney Patented Jan. 30, 1973 3,714,594

2 Sheets-Sheet 2

DEMODULATOR ACOUSTIC SURFACE WAVE DEVICE

CROSS-REFERENCE TO RELATED APPLICATIONS

The present application is a division of application Ser. No. 817,093 filed Apr. 17, 1969, and assigned to the same assignee as the present invention.

The present application is a further development of subject matter disclosed and claimed in the following applications all of which are assigned to the assignee of this invention: Ser. No. 789,839 filed Jan. 8, 1969 in the name of Adrian J. DeVries et al.; Ser. No. 721,038 filed Apr. 12, 1968 in the name of Adrian J. DeVries now U.S. Pat. No. 3,678,364; and Ser. No. 752,073 filed Aug. 12, 1968 in the name of Robert Adler et al.

BACKGROUND OF THE INVENTION

The invention pertains to signal processing apparatus for use in color television receivers. More particularly, it relates to the inclusion in such receivers of surface wave integratable filters (SWIFS) as signal transmission elements that enable construction of much of the receiver entirely of solid-state components.

A variety of circuit arrangements are known for processing a received composite television program signal in order to reproduce a polychrome image and its associated sound. These different arrangements have, in common, stages or channels that impose certain selectivity characteristics in order to act differently on different parts of the received composite signal, that is to say, to split or divide different portions of that signal among different channels, to delay the transmission of the signal component in any one channel relative to another and to act upon the different signal components in a manner determined by their frequency or changes in frequency. Heretofore, many of the signal processing operations have required the use of inductive elements. Typically, these are coils formed by physically winding a length of wire about a core or coil form, yielding a device that often is of significant physical size and which, during manufacture of the receiver, must be fabricated, handled, mounted and adjusted as a separate, discrete component.

Until recently, all television receivers were a combination of a very large number of discrete components such as electron tubes, resistors, condensers and, as mentioned, wire-wound inductors. However, the introduction of the transistor and other solid-state active devices initiated a reduction in component sizes, and the subsequent development of integrated solid-state circuitry has led to at least the anticipation of complete monochrome and color television receivers wherein the entire apparatus, except for the image reproducer, the audio speaker and possibly the radio-frequency tuner, is fabricated of solid-state integrated circuitry. This anticipation has been nurtured because of the capabilty developed in the art of so integrating a number of different circuits each including a variety of active devices, such as transistors, together with interconnecting resistors and capacitors. However, progress toward the ultimate end of a completely integrated receiver has, until recently, been thwarted because of the infeasibility of providing a solid-state equivalent of the inductance necessary to the different signal paths in order to impart such desired characteristics as controlled selectivity and phase shift.

A different approach to obtaining selectivity of a controlled character in the signal transmission channels of color television receivers and other systems that is amenable to solid-state circuitry is the subject of the copending application of Adrian DeVries, Ser. No. 721,038, filed Apr. 12, 1968, which discloses and claims a variety of acoustic-wave devices in which transducers interact with acoustic surface waves propagated on a substrate. By appropriate selection of the propagating material and design of the transducers, a wide variety of different selectivity characteristics may be obtained. Such devices are useful, for example, in the intermediate-frequency channels of television receivers and in discriminators for demodulating FM (frequency-modulated) intelligence such as the audio signal which is part of a composite television program signal. These acoustic wave devices may be fabricated entirely with integrated-circuit techniques and their overall sizes at television frequencies involve dimensions of but fractions of an inch. They lend themselves admirably to combination with other active and passive elements as portions of completely integrated solid-state systems. Because of their nature, such devices have been denoted as surface wave integratable filters and, for convenience, have come to be known by the abbreviation SWIFS.

It is a general object of the present invention to provide new and improved SWIF devices useful for processing signals such as those translated in color television receivers.

It is a specific object of the present invention to provide a new and improved SWIF device for use as a demodulator.

A further object of the present invention is to provide a SWIF device of the foregoing character that is capable of being fabricated by and is fully compatible with conventional techniques employed in the manufacture of integrated solid-state circuits.

SUMMARY OF THE INVENTION

A device constructed in accordance with the present invention generally takes the form of apparatus that is to be interposed between a source and a load. Basic to the device is an acoustic-surface-wave propagating medium. Coupled to that medium in all cases is at least one transducer which, in response to signals transmitted between one or more sources and loads, interacts with acoustic surface waves on the medium. In one frequency-discriminator embodiment, a load is in series combination with a unidirectionally-conductive device that is coupled across the transducer with the latter serving as a frequency-discriminator.

In another embodiment, the signals are applied in push-pull across a pair of such transducers coupled to the medium with the individual transducers exhibiting maximum interaction at frequencies respectively above and below a center frequency. In this version the pair of transducers serve as a discriminator with respect to signals fed to the load which is coupled between the transducers and a plane of reference potential. Other discriminator embodiments utilize at least three such transducers with one serving as a transmitter and the other two serving as receivers to develop a pair of signals that are in phase quadrature; the discriminator further has means, including a pair of diodes individually coupled directly to opposite terminals of one of the receiver transducers, for matrixing the output signals and detecting variations therein in response to frequency deviations of the input signal from a reference or center frequency.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
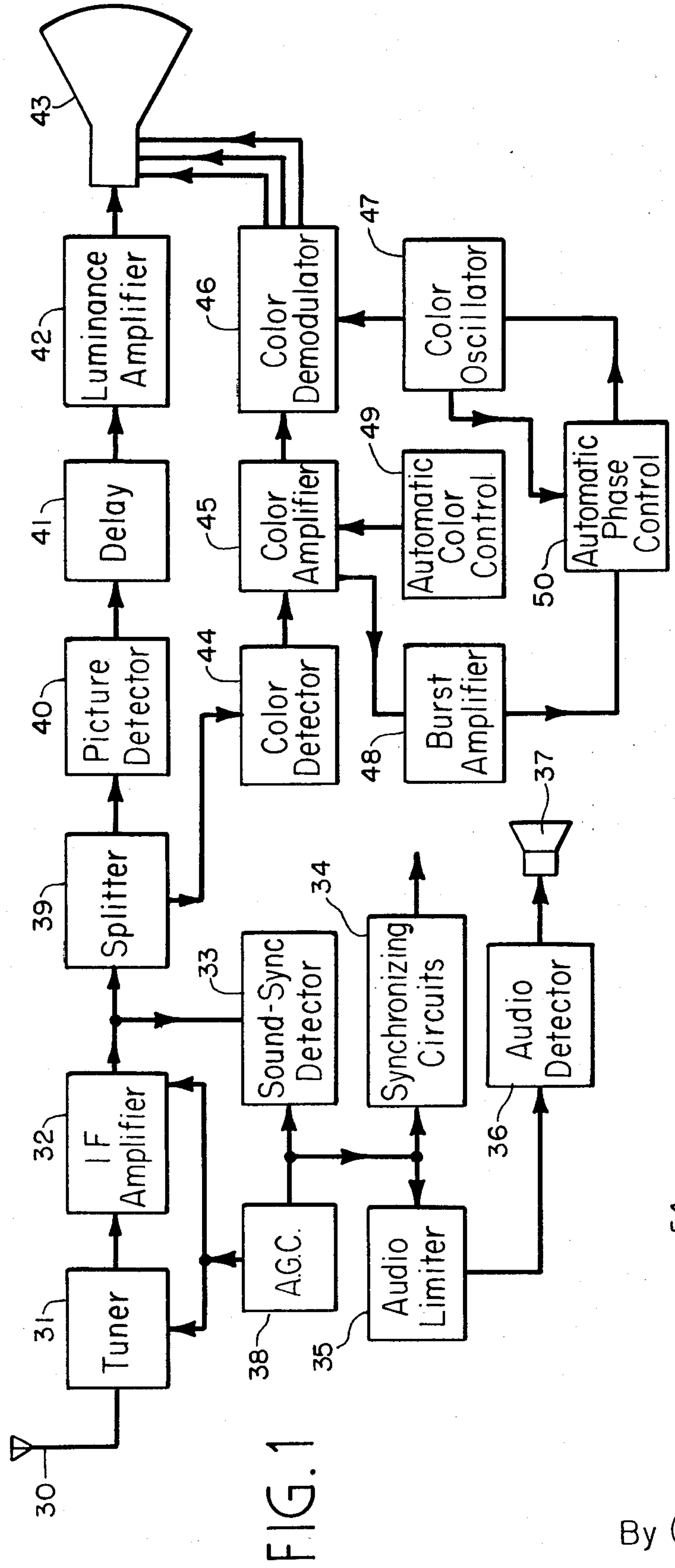
FIG. 1 is a block diagram of a color television receiver in which embodiments of the invention are utilized.

FIG. 1 illustrates a color television receiver having but one of many different signal processing approaches which, in the overall, may be utilized in taking advantage of improvements made available with the present invention. Radio-frequency color program signals received by an antenna 30 are fed to a tuner 31 that selects a desired program signal and converts it to an intermediate-frequency signal which, in turn, is fed to an intermediate-frequency amplifier 32. The frequency response of amplifier 32 is carefully tailored to amplify or attenuate different portions of the composite signal in a manner to be discussed further in connection with FIG. 2. One portion of the signal delivered by amplifier 32 is fed to a detector 33 that selects from the intermediate-frequency signal and demodulates both the synchronizing signals and the audio program signal. Being separable by virtue of their individually different frequency characteristics, these two signals are respectively fed to synchronizing circuits 34 and an audio system composed of a limiter 35, a detector and amplifier 36 and a loud speaker 37. The horizontal-deflection synchronizing signal pulses also are fed to an automatic gain control system 38 in which the level of those pulses is utilized to develop a gain-control potential that is fed back to tuner 31 and to intermediate-frequency amplifier 32 in a manner to control their gain such that the developed intermediate-frequency signal is of constant amplitude; as now well understood, this arrangement preferably includes means for gating or turning on the AGC system only during the existence of the horizontal sync pulses. From a systems' standpoint, as well as with respect to details of circuitry that may be used particularly in the synchronizing circuitry, the operations of the synchronizing, automatic-gain control and audio portions of the receiver are well understood and conventional in the art. Accordingly, they need not be further discussed herein except with respect to certain specific improvements to be described later.

Another portion of the intermediate-frequency output signal from amplifier 32 is fed to a signal splitter 39 that separates certain portions of the composite signal on the basis of frequency; in practice, splitter 39 may be immediately preceded by an additional intermediate-frequency stage for further attenuation of the audio program signal, or, alternatively, this selectivity function may be included in splitter 39 itself. One input signal from splitter 39 is applied to a luminance channel composed of a picture detector 40, a delay element 41 and a luminance amplifier 42. Detector 40 develops from the incoming composite signal a luminance or video signal that is representative of the brightness of the image to be reproduced. For reasons to be described later, that signal is delayed in time by delay element 41 and then strengthened by amplifier 42 before it is applied to one input electrode of each electron gun of an image reproducer 43 which in present-day usage is in the form of a three-gun cathode-ray tube. The video signal is used in this instance to intensity modulate the three electron beams of the color picture tube. Of course, the electron beams are simultaneously caused to be deflected both horizontally and vertically to define an image raster, under the timing control of the synchronizing circuitry.

Another portion of the composite intermediate-frequency signal fed to splitter 39 is directed into a chroma channel basically composed of a color detector 44, a color amplifier 45 and a color demodulator 46. Detector 44 yields a chroma signal that is amplified by amplifier 45 and supplied to demodulator 46 which also receives a reference signal from a color oscillator 47. Demodulator 46 develops three color-control signals, generally representative of red, green and blue in the ultimate image, that are supplied to additional control electrodes of assigned ones of the three electron guns in image-reproducer 43 so as further to control the intensity individually of the three different beams and, hence, the ultimate hue and saturation of the reproduced image. Typically, the color-control signals are so-called color-difference signals that represent, with respect to each color, the difference between the instantaneous value of the luminance signal and the corresponding primary color value of the image point being displayed; by appropriate combination or internal matrixing of these various signals applied to the respective electron beams, essentially true primary colors are developed.

In traversing the chroma channel, the color information signal experiences a time delay and the function of delay element 41 is to similarly delay the luminance signal to the end that, when recombined within image reproducer 43, the luminance and chrominance signals are properly correlated. As will be described further, the function of delay element 41 may be achieved within signal splitter 39 in which case element 41 would not be required as a separate stage. On the other hand, other well-known receiver signal processing systems utilize a common detector for the luminance and chroma signals and in those cases, splitter 39 may be omitted or, in a further alternative, it may be used instead to separate out the audio and synchronizing signals while tailoring the frequency response presented to the composite signal portion fed on to the video detector.

Also associated with the chroma channel and reference oscillator 47 are a burst amplifier 48, an automatic-color-control system 49 and an automatic phase control 50. Amplifier 48 selects from the color signal applied thereto the color burst signal which conventionally is transmitted as a part of the composite program signal to enable synchronized operation of color demodulator 46. To that end, the amplifier is gated or otherwise controlled to supply the color burst signal to an automatic phase control system 50 which also receives a sample of the reference signal developed by oscillator 47. Control system 50 compares the phase of its two input signals to develop a control signal that is fed back to reference oscillator 47 to maintain the phase of its output signal, fed to demodulator 46, precisely at the requisite value. A portion of the color burst signal is also fed from amplifier 48 to an automatic color control system 49 which develops a control signal that is representative of the burst signal amplitude and is fed back to color amplifier 45 to control its gain in a manner to maintain constant the strength of the color signal fed to demodulator 46.

The functions and manner of overall operation of each of the luminance and chroma channels are well understood and basically conventional in the art. It is, therefore, unnecessary to describe them further. Similarly, the receiver is understood to include such conventional additional circuits and components as those which enable the control of tone and volume of the audio signal, contrast and brightness of the image, hue and saturation of the color and a circuit to kill the operation of the chroma channel when the received composite program signal includes only monochrome picture information.

Typically, the receiver also includes a plurality of different traps located at various places in its signal paths in order to preclude transmittal of undesired signal components. Proper operation of the color television receiver demands that each of the several different signal paths thereof exhibit accurately determined selectivity to emphasize and pass those signal components desired in that path and attenuate or reject other signal components that may in any way interfere with the desired components. While the signal-transmission characteristics required in the different paths or channels are now well-known, making it unnecessary to discuss the different characteristics of all of the various different paths, it is appropriate to examine the overall characteristic desired for the intermediate-frequency amplifier, including amplifier 32 and the previously-mentioned additional state that may precede or be included in splitter 39.

Figure 2:
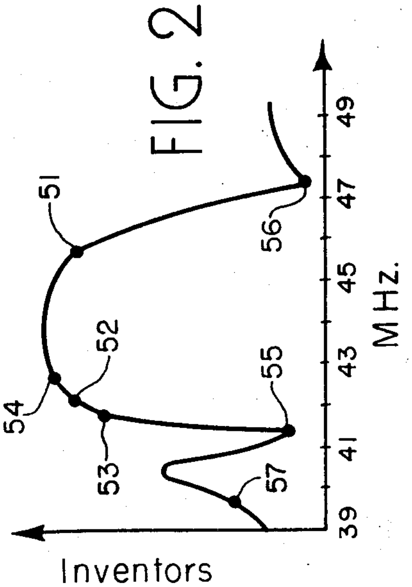
FIG. 2 is a diagram illustrating an intermediate-frequency response desired in the receiver of FIG. 1.

FIG. 2 depicts such a selectivity characteristic or response curve in terms of signal amplitude as a function of frequency. As indicated, the intermediate-frequency channel exhibits a broad bandwidth of transmission for the desired composite program signal between about 41.5 and 46 megahertz. More specifically, the selected composite program signal IF carrier is indicated by marker 51 located at 45.75 megahertz, while the chroma subcarrier thereof, indicated by marker 52, is located at 42.17 megahertz. The upper and lower ends of what may be termed the chroma signal passband are indicated respectively by markers 53 and 54 at 41.17 and 42.77 megahertz. So as not to interfere with the image information, the associated sound carrier is located at 41.25 megahertz as indicated by marker 55 and the sound carrier of the adjacent composite-signal channel is even more greatly attenuated as shown by marker 56 located at 47.25 megahertz. To complete the overall representative, the adjacent program signal channel on the other side has its primary picture carrier located at 39.75 megahertz as depicted by marker 57. It will thus be seen that the overall frequency response of the intermediate-frequency channel is characterized by the presentation of what basically is a broad bandwidth over approximately 4.5 megahertz while being substantially reduced at those frequencies corresponding to the adjacent picture and sound carriers as well as the associated sound carrier. Such reduced response at those points typically has been obtained by the inclusion of additional trap circuits tuned to each of those different frequencies.

As indicated above, application Ser. No. 721,038 discloses in detail an approach that employs a combination of SWIFS in the intermediate-frequency channel of a color television receiver to achieve a selectivity characteristic of the kind shown in FIG. 2. In one example, the individual selectivity characteristics of three different SWIFS in series in the intermediate-frequency channel are combined to give the overall desired characteristic. The use of the SWIFS, instead of such typical frequency-determining elements as coils, enables construction of the entire intermediate-frequency amplifier as a single integrated circuit extremely small in size.

Figure 3:
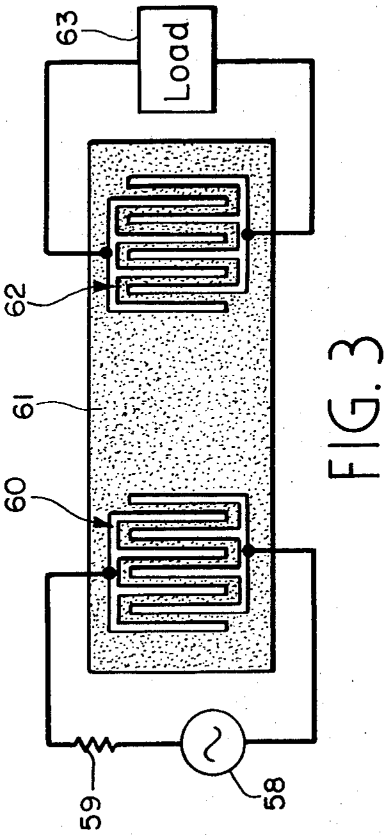
FIG. 3 is a schematic diagram of a SWIF system.

For the purpose of explaining in more detail the basic nature and principles of operation of a SWIF in general FIG. 3 illustrates one form of a very simple SWIF that also is disclosed and described in the aforementioned copending application. A signal source 58 in series with a resistor 59, which may represent the internal impedance of that source, is connected across an input transducer 60 mechanically coupled to one major surface of a body of piezoelectric material shown as a substrate 61 and which serves as an acoustic-surface-wave propagating medium. An output or second portion of the same surface of substrate 61 is, in turn, mechanically coupled to an output transducer 62 across which a load 63 is coupled.

Transducers 60 and 62 in this simplest arrangement are identical and are individually constructed of two comb-type electrode arrays. The stripes or conductive elements of one comb are interleaved with the stripes of the other. The electrodes are of a material, such as gold or aluminum, which may be vacuum deposited or photoetched on a smoothly-lapped and polished planar surface of the piezoelectric body. The piezoelectric material is one, such as PZT, Zinc, Oxide, Lithium Niobate or quartz, that is propagative of acoustic surface waves. The distance between the centers of two consecutive stripes in each array is one-half of the acoustic wavelength of the signal wave for which it is desired to achieve maximum response.

Direct piezoelectric surface-wave transduction is accomplished by the spatially periodic interdigital electrodes or teeth of transducer 60. A periodic electric field is produced when a signal from source 58 is fed to the electrodes and, through piezoelectric coupling, the electric signal is transduced to a traveling acoustic wave on substrate 61. This occurs when the stress components produced by the electric fields in the piezoelectric substrate are substantially matched to the stress components associated with the surface-wave mode. Source 58, for example, a portion of the television receiver in FIG. 1, produces a range of signal frequencies, but due to the selective nature of the arrangement only a particular frequency and its intelligence carrying sidebands are converted to a utilized surface wave. More specifically, source 58 may be tuner 31 which selects the desired program signal for application to load 63 which in this environment includes one or more of those signal channels beginning with detectors 33, 40 and 44. The surface waves resulting in substrate 61, in response to the energization of transducer 60 by the IF signal, are transmitted along the substrate to output transducer 62 where they are converted to an electrical signal for application to load 63. The signal will suffer attenuation in traversing the SWIF under consideration which will be compensated and the other IF gain requirement satisfied by IF amplification, preferably of the solid state type e.g. transistors associated with or formed as part of the SWIF.

In a typical television IF embodiment, utilizing PZT as the piezoelectric substrate, the stripes of both transducer 60 and transducer 62 are approximately 0.5 mil wide and are separated by 0.5 mil for the application of an IF signal in the typical range of 40–46 megahertz. The spacing between transducer 60 and transducer 62 is on the order of 60 mils and the width of the wavefront is of approximately 0.1 inch. This structure of transducers 60 and 62 and substrate 61 can be compared to a cascade of two tuned circuits with a resonant frequency of approximately 40 megahertz, the resonant frequency being determined, at least to a first order, by the spacing of the stripes of the transducers.

The potential developed between any given pair of successive strips in electrode array 60 produces two waves traveling along the surface of substrate 61 in opposing directions perpendicular to the stripes for the illustrative isotropic case of a ceramic poled perpendicularly to the surface. When the center-to-center distance between the stripes is one-half of the acoustic wavelength of the wave at the desired input frequency, or is an odd multiple thereof, relative maxima of the output waves are produced by piezoelectric transduction in transducer 62. For increased selectivity, additional electrode stripes are added to the comb patterns of transducers 60 and 62. Further modifications and adjustments are described in the aforementioned copending application for the purpose of particularly shaping the response presented by the filter to the transmitted signal.

Standard-broadcast television program signals convey the audio intelligence as a frequency modulation of a sound subcarrier. While the audio information may be derived directly from the intermediate frequency audio subcarrier at 41.25 megahertz, in which case detector 33 would merely pass that signal to limiter 35, it is preferred to utilize the well-known approach in which detector 33 produces a 4.5 megahertz intercarrier beat signal that is modulated with the audio information. Accordingly, audio detector 36 in FIG. 1 is a detector for demodulating the frequency-modulated audio signals from the intercarrier beat signal. Solid-state integrated fabrication of that detector is afforded by the discriminator of FIG. 4 wherein a SWIF includes but a single transducer 64 disposed on the surface of a piezoelectric substrate 65. The center-to-center spacing of the electrodes forming the interleaved combs of transducer 64 correspond to one-half of a surface-wave-wavelength at the 4.5 megahertz intercarrier beat frequency.

Coupled across transducer 64 through a blocking capacitor 66 is a source 67 which in this case is audio limiter 35. Also coupled directly across transducer 64 is the series combination of a unidirectionally-conductive device or diode 68 and a load 69 herein exemplified by loud speaker 37 which usually would be preceded by one or more stages of audio amplification. A resistor 70 connected across transducer 64 serves as a direct-current bypass, and a discharge resistor 71 paralleled by a holding capacitor 72, with both being connected in parallel to load 69, form a peak detector load circuit for diode 68.

Figure 4:
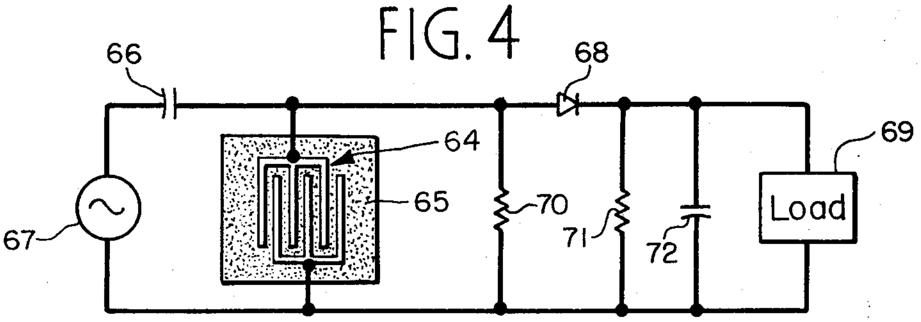
FIG. 4 is a schematic diagram of a SWIF discriminator.
Figure 5:
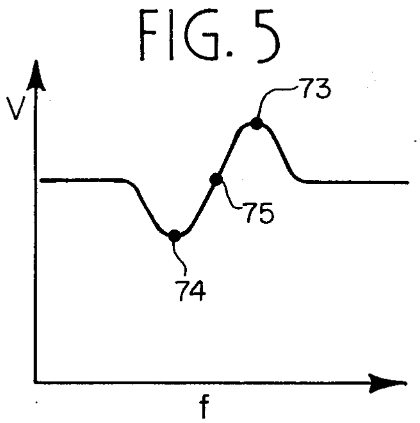
FIG. 5 is a response curve illustrating a characteristic of the FIG. 4 discriminator.

In operation, the discriminator in FIG. 4 presents, to the signals from source 67, a selectivity response illustrated by the curve in FIG. 5 which represents the amplitude of the output signal applied to load 69 as a function of frequency. Transducer 64 as incorporated with the other circuit elements exhibits maximum response, by virtue of the selection of its electrode spacing, at a point 73. This represents an antiresonant condition of the transducer. Upon an increase in the frequency of an applied signal from a much lower value toward point 73, the signal first encounters a region of increased attenuation as indicated at point 74; this occurs because of a condition of series resonance of the transducer and its associated circuitry. By selecting the electrode spacing of transducer 64 so that the combination of capacitor 66 and transducer 64 exhibits maximum response at point 73, the center of undeviated frequency of the incoming frequency modulated signal is caused to be located at a point 75 approximately midway between points 73 and 74 in the region of the curve that exhibits a substantially typical linear frequency-discrimination characteristic. Consequently, the audio intelligence carried by the incoming frequency-modulated signal is converted to an amplitude-modulated signal that is detected by diode 68 and supplied to load 69.

Figure 6:
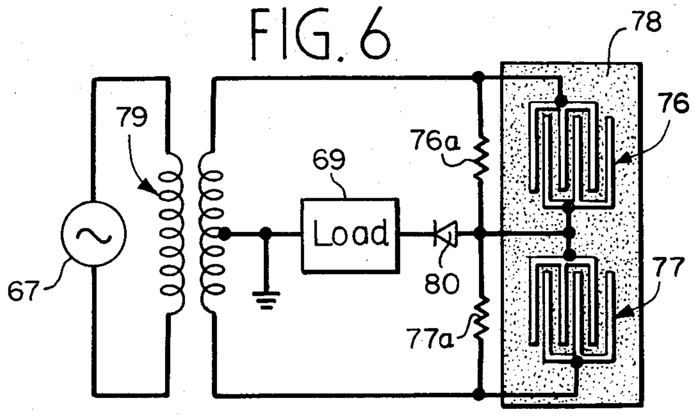
FIGS. 6, 7 and 8 are schematic diagrams of alternative SWIF discriminators.

An alternative discriminator for interposition between source 67 and load 69 is shown in FIG. 6 wherein a pair of transducers 76 and 77 are disposed on a piezoelectric substrate 78. Transducers 76 and 77 are spaced laterally apart on substrate 78 so that each interacts exclusively with its own set of acoustic surface waves. In a manner the same as that described in copending application of Adrian DeVries, Ser. No. 681,524, filed Nov. 8, 1967, transducers 76 and 77 are interconnected in a bridge network and fed in push-pull from source 67. Also similarly, the two transducers are tuned to somewhat different frequencies so as to unbalance the bridge with the result that a signal is fed to load 69. In this case, however, load 69 constitutes a portion of a peak detector. In more detail, the primary winding of a transformer 79 is coupled across source 67 while the opposite ends of its secondary winding are connected across transducers 76 and 77 which, in turn, are interconnected in series combination and individually shunted by respective direct-current bypass resistors 76*a* and 77*a*. The series combination of load 69 and a diode 80 is connected between a point intermediate transducers 76 and 77 and a center tap on the secondary winding which represents a point of reference potential here indicated as ground; load 69 includes a discharge resistor and holding capacitor, as in the system of FIG. 4, to serve along with diode 80 as a peak detector circuit.

In operation, the frequency-modulated signals from source 67 are applied to the series combination of transducers 76 and 77 in push-pull with respect to the point of reference potential. The transducers and the transformer secondary winding together act as a band-pass filter having a conventionally shaped frequency response curve. By selecting the individual response peaks of transducers 76 and 77 so that the undeviated or center frequency of the signal from source 67 falls on an intermediate portion of one slope of the overall response curve, the audio information is demodulated.

Figures 7, 8:
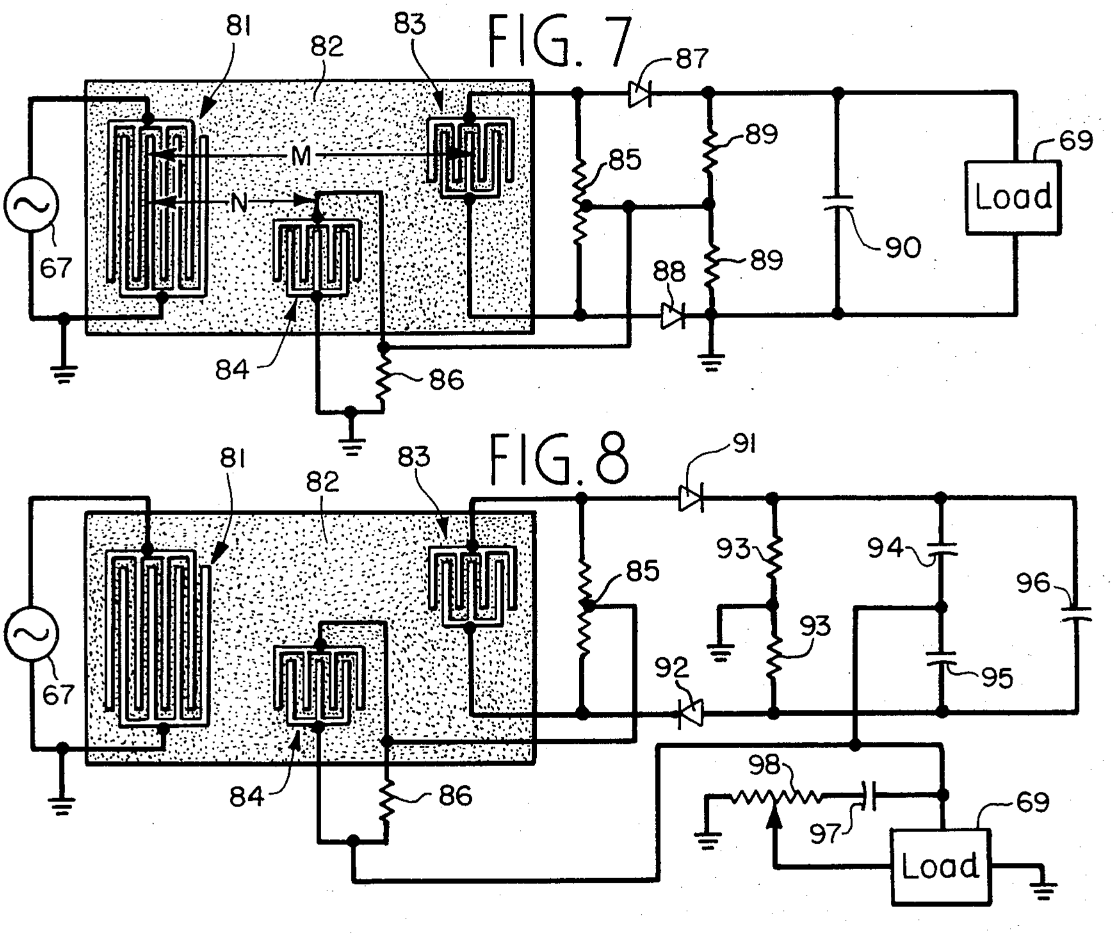

Two alternative frequency-modulation detectors appear in FIGS. 7 and 8. In both cases, input source 67 is coupled across an input or transmitting transducer 81 disposed on a substrate 82 of the piezoelectric material. Also situated on that surface of substrate 82 are a pair of output transducers 83 and 84 with transducer 83 being disposed toward one side of the path of the waves launched by transducer 81 and transducer 84 being disposed to the other side of that path. Moreover, transducer 83 is spaced from transducer 81 by a distance M while the spacing between the input transducer and the other output transducer 84 is a lesser distance N. The distance M differs from the distance N by an amount that equals an integral number of surface wavelengths plus or minus one quarter of such a wavelength, the wavelength corresponding to the center frequency of the frequency-modulated signal. Also, all three transducers 81, 83 and 84 have their electrode spacings selected so as to exhibit maximum response at that center frequency. By reason of the relative spacings of the two output transducers from the input transducer, the output signals developed individually across the respective output transducers are in phase quadrature.

Also in both of FIGS. 7 and 8, the output signals developed by transducer 83 are derived in push-pull from across a center-tapped load resistor 85. The other output signals from transducer 84 are developed across a load resistor 86 that shunts that transducer and is connected between the center-tap and a plane of reference potential shown as ground in FIG. 7 and as a balance point in the network of FIG. 8. In each of these two discriminators, the push-pull signals appearing across load resistor 85 are applied to a network which includes a matrix and direct-current-return path such that the quadrature potential developed by transducer 84 is suitably inserted into the network and matrixed with the output signal from transducer 83.

In FIG. 7, the matrix network includes a pair of diodes 87 and 88 individually connected with the same direction of polarity to respective opposite ends of resistor 85. The other, or cathode ends, of the diodes individually are connected to respective opposite ends of another center-tapped resistor 89, and its center tap is connected in common with that of load resistor 85. Load 69 is connected across the opposing ends of resistor 89 which also is shunted by a smoothing capacitor 90. One end of resistor 89 also is connected to ground. The FIG. 7 discriminator resembles the well-known Foster-Seeley type. At center frequency the output signal level is zero regardless of the input signal level; consequently, amplitude variations are balanced out to a degree.

The matrixing and detecting network of FIG. 8 is generally similar to that of the previous version except that one of the diodes is reversed in polarity so that diode 91 has its anode connected to one end of resistor 85 while diode 92 is connected from its cathode to the other end of that resistor; each half of resistor 85 presents a reasonably low impedance to intermediate frequency signals. The other terminals of diodes 91 and 92 are connected by a resistor 93 center-tapped to ground, a capacitive divider composed of capacitors 94 and 95 and a storage capacitor 96 on which a reference or damping potential inherently is maintained during operation. The outgoing audio signal is derived from between capacitors 94 and 95 and fed through a blocking capacitor 97 across a potentiometer 98 unbalanced to ground. The output signal as presented across resistor 98 is picked off by the tap on the potentiometer and fed to one terminal of load 69 the other terminal of which is also connected to ground. This FIG. 8 version is similar in operation to the conventional ratio-detector demodulator. Should the input signal level suddenly change, capacitor 96 acts as a damper and thus tends to reduce the effect of that change. Hence, there is a degree of amplitude limiting effect.

Both the discriminators of FIGS. 7 and 8, as well as those of FIGS. 4 and 6, have a distinct advantage in that the selectivity of the resultant audio detection channel is controlled by one or more of the SWIF transducers involved. For example, in each of FIGS. 7 and 8 the selectivity may be limited to as narrow a band as desired by the choice of the number of electrodes employed in input transducer 81; an increase in the total number of electrodes serves to decrease the bandwidth. An additional advantage of the arrangements of FIGS. 7 and 8 is the presence of an inherent balancing function so as at least partially to preclude the detection of spurious information in the form of amplitude changes in the incoming signal. Consequently, the purpose served by audio limiter 35 in FIG. 1 is enhanced and, in some cases, that limiter may even be omitted.

In both FIGS. 7 and 8, the frequency to amplitude conversion of the intelligence-carrying modulation is obtained by applying to a pair of diodes voltages that are in quadrature whenever the frequency-modulation carrier is unmodulated. The relative phase of the quadrature signals is altered in direct proportion to the modulation frequency swing. That change alters the phase of the relative potentials across the diodes in a manner such that the detected difference voltage is a replica of the modulating signal.

To aid a particular application of the discriminator of either of FIGS. 7 and 8, it may be noted that the phase shift $\phi$ between the output signals from transducers 83 and 84 can be represented by the expression:

$$\phi = (M - N)/\lambda \, 2\pi \, ,$$

when the two transducers are alike (except for spacing from transducer 81) and where $\lambda$ is the instantaneous wavelength of the surface waves. From the previous discussion, the output transducer spacing difference can be written:

$$M - N = (n + 1/2)\, \lambda_o/2 \, ,$$

where $n$ is an integer and $\lambda_o$ is the wavelength of the surface waves at the undeviated center frequency $f_o$. From these two relationships:

$$\phi = (n + 1/2)\, (f/f_o)\, \pi \, ,$$

where $f$ is the instantaneous input signal frequency. It may also be noted that, by definition, the surface-wave velocity $\nu$ may be expressed:

$$\nu = f\lambda = f_o \lambda_o \, .$$

Also by definition:

$$f = f_o + \Delta f,$$

where $\Delta f$ is the instantaneous deviation of the input signal from the center frequency $f_o$. Consequently:

$$\phi = (n + 1/2)\pi + (n = 1/2)\, (\Delta f/f_o)\, \pi \, .$$

For good linearity, the variation in phase angle $\phi$ generally should be less than about forty-five degrees. In the present television environment utilizing intercarrier sound take-off, the quantity $\Delta f/f_o$ is approximately $10^{-2}$ (or the value of $\Delta\lambda/\lambda_o$ approximates one-hundredth). This indicates, for a practical value of $n$ of about 25, a spacing ($M-N$) of 12 ¾ wavelengths.

In one alternative to either the system of FIG. 7 or that of FIG. 8, the efficiency of the SWIF is improved by elongating substrate 82 and disposing a mirror-image pair of receiving transducers to the left of input transducer 81 and connecting them individually in parallel with respect to transducers 83 and 84. In that manner, the surface waves inherently launched to the left of input transducer 81 also are utilized in the development of the demodulated output signal. In a still different version of these two discriminators, transducer 81 is disposed on substrate 82 between output transducers 83 and 84, the input transducer being closer to one of the output transducers than the other by the aforementioned difference ($M-N$) so that the quadrature relationship of the output signals at the center frequency is maintained. In this version, the efficiency also may be increased by extending the length of the electrodes in each of transducers 83 and 84 so as to interact with the full width of the wavefronts launched by input transducer 81 in the two respective directions, although some change in the parameters may be needed in order to compensate the increased mutual transducer interaction. Moreover, transducer 84 can, in principle, be omitted and its function served by transducer 81. However, the illustrated arrangements may be more advantageous in many cases because of the increased isolation between input and output and of additional selectivity.

While particular embodiments of the invention have been shown and described, modifications may be made, and it is intended in the appended claims to cover all such modifications as may fall within the true spirit and scope of the invention.

We claim:

1. In an RF receiver, a demodulator for recovering the information contained in the sidebands of a modulated FM carrier of a predetermined frequency, comprising:

a piezoelectric acoustic surface-wave propagating medium;

an electro-acoustic surface-wave transducer mechanically coupled to said medium;

means for applying said FM carrier across said transducer, said transducer generating and interacting with said acoustic surface-waves on said medium in response to said FM carrier so as to present to said FM Carrier an anti-resonant, frequency selective characteristic frequency-positioned such that the frequencies of said FM carrier and its associated sidebands are located on one slope of said frequency selective characteristic, whereby frequency deviations of said FM carrier are converted to corresponding amplitude variations;

means for peak detecting said amplitude variations, including a unidirectionally conductive device serially connected to a load, a holding capacitor coupled across said load, the series combination of said load and unidirectionally conductive device being coupled across said transducer, and a resistive element coupled across said transducer to provide a DC return path for said unidirectionally conductive device.

2. In an RF carrier, a demodulator for recovering the information contained in the sidebands of a modulated FM carrier of a predetermined center frequency, comprising:

a piezoelectric acoustic surface-wave propagating medium;

an electro-acoustic surface-wave transducer mechanically coupled to said medium generating and interacting with acoustic surface-waves on said medium to provide a frequency selective characteristic exhibiting a condition of anti-resonance at a first given frequency displaced from the frequency of said FM carrier in a given direction;

a capacitor serially coupling said FM carrier across said transducer, said capacitor being of a given value to interact with said transducer to produce a condition of series resonance at a second frequency displaced from the frequency of said FM carrier in a direction opposite to said given direction so that the center frequency of said FM carrier lies approximately midway between said first and second given frequencies, whereby frequency deviations of said FM carrier are connected to corresponding amplitude variations;

means for peak detecting said amplitude variations, including a unidirectionally conductive device serially connected to a load, a holding capacitor coupled across said load, the series combination of said load and unidirectionally conductive device being coupled across said transducer, and a resistive element coupled across said transducer to provide a DC return path for said unidirectionally conductive device.

3. A system for converting the frequency deviations of an FM signal of center frequency $f_o$ to corresponding amplitude variations, comprising:

a piezoelectric acoustic surface-wave propagating medium;

a first transducer coupled to said medium and exhibiting a maximum response at said center frequency $f_o$ of said FM carrier;

means for applying said FM carrier across said first transducer to cause said transducer to launch on said medium acoustic surface waves characterizing said FM carrier;

a second transducer means coupled to a second portion of said medium having a first predetermined spacing $M$ from said first transducer and being responsive to said launched surface waves for developing a first output signal $e_1$;

a third transducer means coupled to a third portion of said medium having a second predetermined spacing N from said first transducer and being responsive to said launched surface waves for developing a second output signal $e_2$ having a phase $\phi$ relative to said first output signal equal to $(M-N)/\lambda 2\ \pi$ where $\lambda$ is the instantaneous wavelength of a surface wave, whereby a given range of $\phi$ can be preselected for a given frequency deviation $\Delta F$ from $f_o$ of said FM carrier by appropriate selection of $(M-N)$;

means for combining said first and second output signals to produce a third output signal $e_3$ which is such that $e_3$ equals $e_2+e_{1/2}$ and a fourth output signal $e_4$ which is such that $e_4=e_2-e_{1/2}$, $(M-N)$ being chosen according to the formula $M-N=(n+½)\lambda_o/2$ where $n$ is an integer and $\lambda_o$ is the wavelength of the surface waves at the undeviated center frequency $f_o$, whereby phase differences between $e_1$ and $e_2$ resulting from frequency deviations from $f_o$ of said FM carrier are converted to corresponding amplitude differences in $e_3$ and $e_4$.

4. A system as defined in claim 3 for demodulating said FM signal, including means for peak detecting and combining said output signals $e_3$ and $e_4$ to generate a final output signal consisting of the desired information contained in the modulation of said FM carrier.

* * * * *